Nov. 30, 1954     C. A. ROBERTSON     2,695,684

FRICTION BRAKE ASSEMBLY

Filed July 5, 1952

INVENTOR.
CHARLES A. ROBERTSON
BY
Townsend and Townsend
ATTORNEYS

U
United States Patent Office 2,695,684
Patented Nov. 30, 1954

2,695,684

FRICTION BRAKE ASSEMBLY

Charles A. Robertson, San Francisco, Calif., assignor to Tice Valley Ranch, doing business as Dollar Industries, San Francisco, Calif., a corporation of California Application July 5, 1952, Serial No. 297,214

2 Claims. (Cl. 188—136)

This invention relates to a new and improved brake assembly.

Each embodiment of the invention illustrated in the drawings is shown as comprising a brake assembly incorporating a stationary member and a rotatable member having a circular braking surface; a brake shoe having a face contoured corresponding to the curvature of the braking surface of the rotating member; an arcuate rack or gear segment provided on the shoe having a curvature disposed eccentrically with respect to the curvature of the face of the shoe thereby defining an arcuate wedge-shaped body or portion between the shoe face and gear segment; and a pinion rotatably journaled to the stationary member in mesh engagement with the gear segment for moving said shoe into and out of wedged frictional engagement with respect to the braking surface on the rotating member.

A particular object and advantage of the invention is to provide a friction brake assembly which incorporates a brake shoe provided with a wedge-shaped body, by which it is possible, through cooperation of associated elements, to cause the brake shoe to be tightly and firmly wedged or forced into frictional engagement with a brake drum or equivalent member presenting a braking surface. The arrangement is such that extremely efficient and sure braking action may be effected with no practical possibility of the braking elements becoming locked or jammed so that release of the brake is rendered difficult.

Another object and advantage of a brake assembly embodying the invention is that the efficiency and effectiveness of the brake is not affected to any noticeable or practical extent by virtue of prolonged use thereof, with resultant partial wearing away and thinning of the brake lining. More specifically, the movement of the shoe against the brake drum into tightly-wedged frictional engagement is not dependent upon or affected by the thickness, per se, of the brake lining material; and, for all practical purposes, a shoe with lining which has worn fairly thin will brake as effectively as a shoe provided with new or unworn lining.

Another object and advantage of the invention is to provide a brake shoe and drum assembly which is of a self-energizing type—i. e., as soon as the braking action is commenced, continued rotation of the drum against the brake will automatically tend to increase the amount of frictional brake resistance between the shoe and rotating drum.

Other objects and advantages of the present invention will become apparent upon reading the following specification and referring to the accompanying drawing in which similar characters of reference represent corresponding parts in each of the several views.

Figure 1:
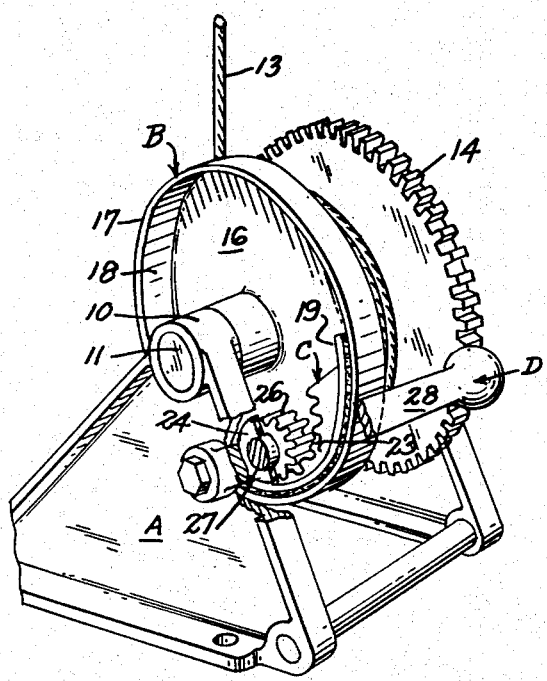
Fig. 1 is a fragmentary perspective view of a guy winch embodying the invention with parts thereof broken away.
Figure 4:
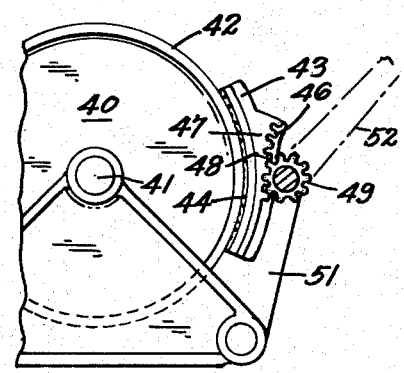
Fig. 4 is an end view of a modified form of brake assembly embodying the invention incorporating an external brake shoe.
Figure 2:
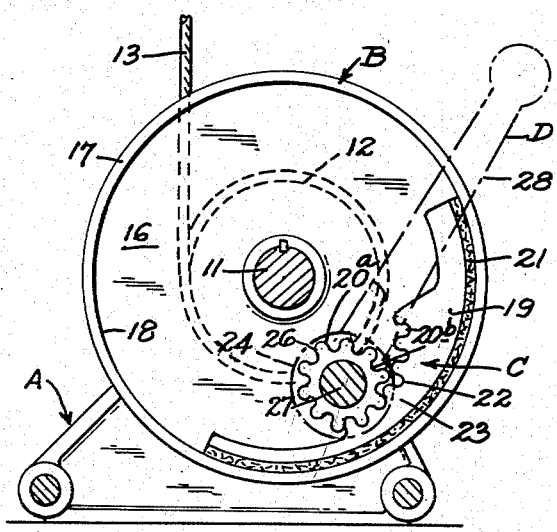
Fig. 2 is an end view in section of the assembly shown in Fig. 1.
Figure 3:
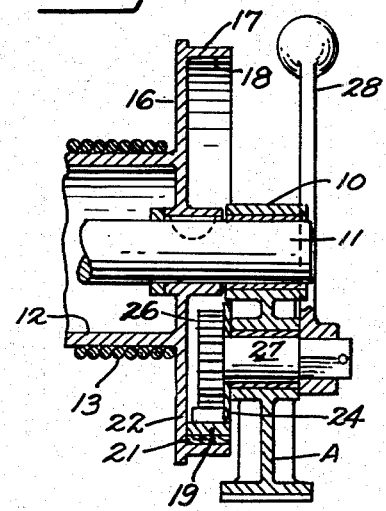
Fig. 3 is a fragmentary longitudinal sectional view of the assembly shown in Fig. 1.

Referring now more particularly to Figs. 1, 2, and 3 in the drawing, the guy winch therein shown embodying the invention comprises, generally, a stationary supporting structure, indicated generally at A, a winch and brake drum assembly, indicated generally at B, a brake shoe assembly, indicated generally at C, and brake actuating means, indicated generally at D.

The stationary supporting structure A is shown as comprising, more specifically, a pair of spaced, similarly constructed, more or less conventional triangular frame supports with aligned axle bearings 10 which support rotatably winch and brake drum axle 11.

The winch and brake drum assembly, heretofore designed generally at B, comprises, more specifically, a hoist drum keyed to axle 11 and comprising a drum body 12, about which winch cable or rope 13 is wound, and a pair of spaced circular end plates comprising a conventional gear plate 14 and a brake drum supporting plate 16. End plate 16 is provided with an annular flange 17, the interior face of which establishes a circular braking drum surface 18 against which the brake shoe is adapted to operate.

The brake shoe assembly, heretofore designated generally at C, comprises, more specifically, a brake shoe 19 having an arcuate shoe face, comprising conventional brake lining material 21, contoured to frictionally engage interior braking surface 18 of the brake drum 17. The backside of shoe 19 is provided with an arcuate gear segment or rack 22, the curvature of which is disposed eccentrically with respect to the curvature of shoe face 21, thereby defining an arcuate wedge-shaped body of material 23 between the gear segment and the shoe face.

In the embodiment of the invention shown in Figs. 1–3 the shoe 19 is mounted loosely interiorly of the brake drum for movement against and away from wedged frictional engagement with respect to braking surface 18 of the drum.

The brake shoe actuating means, heretofore designated generally at D, is shown as comprising, more specifically, a pinion 26 keyed to pin or axle 27, which latter element in turn is supported rotatably within a suitable bearing provided on stationary frame A. An actuating brake handle or lever 28, keyed or otherwise secured to the outer end of axle 27, may be provided as a means for rotating the axle and pinion in either direction.

Preferably a retaining washer 24 having a diameter slightly larger than pinion 26 is disposed between said pinion and its bearing. The purpose of the retaining washer is to prevent lateral displacement of brake shoe 19 outwardly from within the confines of the brake drum.

It will be further observed that the gear teeth on both the rack 22 and pinion 26 are of a rounded stub tooth variety, and wherein the gear teeth 20a and the spaces 20 between the teeth are of substantially the same shape, although the size of the spaces are a little larger than the teeth themselves to substantially wholly accommodate said teeth when the pinion and rack are in mesh, and with substantially no clearance being provided between the top of a tooth and the bottom of the space into which said tooth projects when the pinion and rack are in mesh. It has been found that this type of gear construction functions exceptionally well in a brake assembly of the character herein described. One particular advantage of the gear arrangement is that there is no noticeable tendency of the gears to stick or lock together, regardless of how tightly the brake shoe is wedged against the brake drum, and regardless of the amount of wear on the gears which may occur after prolonged use.

The operation of the device is briefly as follows: In the arrangement shown, and referring particularly to Figs. 1 and 2, the direction of cable winding is counter-clockwise and the direction of unwinding is clockwise. The brake shoe assembly is adapted primarily to brake the drum against unwinding—i. e., when the drum is rotating in a clockwise direction. If it is desired to brake the drum during unwinding thereof and when the drum is moving in a clockwise direction, as aforesaid, handle 28 is manually moved to the right or downwardly, and the pinion-rack engagement will cause shoe 19 to move clockwise and cause the wedging of the shoe between the pinion and braking surface 18 of the drum. It is believed evident that the greater the frictional resistance between the shoe and the drum, the more will be the tendency of the revolving drum to move the shoe clockwise into tighter wedged engagement between the pinion and the drum surface and thereby increase the effective braking action. Moreover, because of the wedge structure of the shoe, it is seen that wear of the lining will not materially affect the braking efficiency of the device. In short, if after prolonged use the lining should wear relatively thin, the shoe can still be as tightly wedged between the pinion and drum as if the lining were substantially unworn and relatively thicker.

To release the brake it is only necessary to move brake handle 28 upwardly and to the left, which, in turn, will cause pinion 26 to move shoe lining 21 out of wedged engagement against the drum. Because the shoe is loosely mounted within the drum assembly, it will, of course, continue to frictionally drag against the drum during both winding and unwinding rotation of said drum. However, it will be found that in devices such as guy winches, the amount of continuous relatively slight frictional contact between the drum and shoe does not materially affect the efficient operativeness of the hoist, nor does it, to any pronounced extent, cause premature wearing out of the brake lining.

Fig. 3 discloses a modified brake assembly embodying the invention and which operates on principles generally similar to the first above described embodiment. In Fig. 3 the brake assembly incorporates an external brake shoe adapted to frictionally engage an external braking surface of a rotatable member. More specifically, the arrangement shown in Fig. 3 comprises a rotatable element, comprising a drum 40 supported rotatably by axle 41, and defining an external circular braking surface 42. External brake shoe 43 is formed with an arcuate face, comprising brake lining material 44, contoured to frictionally engage the braking surface 42 of drum 40. Shoe 43 is provided with an arcuate rack or gear segment 46, having a curvature disposed eccentrically to the curvature of shoe face 44, and defining a wedge-shaped body 47 between the gear teeth 48 and said shoe face 44. A pinion 49 in mesh engagement with rack 46 is journaled to a suitable stationary support 51 and can be rotated in either direction upon manipulation of brake lever 52, associated with said pinion for moving the brake shoe into and out of wedged frictional brake engagement with respect to the braking surface 42 of drum 40.

In this connection movement of brake lever 52 upwardly will cause the pinion 49 to rotate and force the shoe into wedged engagement between the pinion and the drum and thereby effect braking action on the drum. Similarly, to release the brake, lever 52 is moved downwardly and to the right to cause movement of the brake shoe out of tight wedged engagement between the pinion and the drum.

Although the invention has been described in some detail by way of illustration and example for purposes of clarity of understanding, it is understood that certain changes and modifications may be made within the spirit of the invention and scope of the appended claims.

I claim:

1. A friction brake assembly comprising; a circular drum defining an internal circular braking surface and a brake shoe disposed loosely within said drum having an arcuate face frictionally engaging the inner braking surface of said drum, said shoe mounted for movement in a direction relatively toward and away from the inner braking surface of said drum for establishing correspondingly greater and lesser frictional resistance against said braking surface, an arcuate gear rack provided on said shoe, the curvature of said rack disposed eccentrically with respect to the curvature of said shoe face defining an arcuate wedge-shaped body between said rack and said shoe face, a member supported stationary with respect to said shoe and drum, a pinion mounted rotatably on said stationary member in mesh engagement with said gear rack, and means for rotating said pinion in either direction for moving said shoe into and out of wedged frictional engagement with respect to the braking surface of said drum.

2. A brake assembly according to claim 1 and wherein the gear teeth and spaces between said teeth on said rack and said pinion are rounded in profile and are shaped and proportioned to present substantially no clearance between a top of a gear tooth and the space into which it projects when said pinion and rack are in mesh.

References Cited in the file of this patent

UNITED STATES PATENTS

| Number | Name | Date |
|---|---|---|
| 286,998 | Castle et al. | Oct. 23, 1883 |
| 1,743,991 | Stein | Jan. 14, 1930 |
| 2,031,742 | Smith et al. | Feb. 25, 1936 |

FOREIGN PATENTS

| Number | Country | Date |
|---|---|---|
| 653,843 | France | Mar. 28, 1929 |